United States Patent

Hooser et al.

[11] Patent Number: 5,915,430
[45] Date of Patent: Jun. 29, 1999

[54] COST-EFFECTIVE CUTTING DEVICE

[75] Inventors: Steven M. Hooser, Batavia; Robert A. Hooser, St. Charles, both of Ill.

[73] Assignee: Praxis Illinois, Inc., Batavia, Ill.

[21] Appl. No.: 09/071,336

[22] Filed: May 1, 1998

[51] Int. Cl.⁶ ................................................. B27G 13/00
[52] U.S. Cl. ............... 144/231; 144/24.12; 144/218; 144/229; 144/334
[58] Field of Search ............... 83/848–855; 144/24.12, 144/218, 222, 223, 231, 228, 235, 236, 237, 238, 241, 334, 229; 299/91

[56] References Cited

U.S. PATENT DOCUMENTS

| 2,860,477 | 11/1958 | Chambliss | 144/238 |
| 3,228,438 | 1/1966 | Serry . | |
| 3,318,348 | 5/1967 | Gehrli | 144/238 |
| 3,797,544 | 3/1974 | Ver Ploeg | 144/235 |
| 4,757,848 | 7/1988 | Molberg, Jr. | 144/24.12 |
| 4,827,995 | 5/1989 | Wilson | 144/24.12 |
| 4,964,448 | 10/1990 | Schultz | 144/223 |
| 4,974,649 | 12/1990 | Manning | 144/235 |
| 5,034,407 | 7/1991 | Hooser | 144/24.13 |
| 5,115,845 | 5/1992 | Hooser | 144/24.12 |
| 5,171,312 | 12/1992 | Salyer | 606/81 |
| 5,279,345 | 1/1994 | LeMaux et al. | 144/235 |
| 5,365,986 | 11/1994 | Hooser | 144/231 |

*Primary Examiner*—W. Donald Bray
*Attorney, Agent, or Firm*—Olson & Hierl, Ltd.

[57] ABSTRACT

A rotary cutting device suitable for stump grinding comprises a power shaft having a fixed annular flange, a segmented tool carrier removably mounted to the flange and constituted by plural segments which together form a disc. Each of the segments of the tool carrier have a hub portion and a unitary arm that extends out radially from the hub. Cutting tools are mounted to each arm and together provide a cutting tool array about the periphery of the cutting device.

17 Claims, 3 Drawing Sheets

COST-EFFECTIVE CUTTING DEVICE

FIELD OF THE INVENTION

This invention relates to rotating grinding devices suitable for tree stump removal, ground trenching, and the like.

BACKGROUND OF THE INVENTION

In-place stump grinding has proven an excellent alternative to uprooting for tree stump removal. A variety of stump grinding machines are known. One highly successful device is described in the commonly owned U.S. Pat. No. 5,115,845 to Hooser, which is incorporated herein by reference to the extent pertinent.

Because of the harsh service conditions, grinding stump removers wear greatly on their cutting devices. In order to avoid frequent tool replacements, cutting devices for grinding stump removers must be highly durable. One exceptionally durable cutting device is disclosed in U.S. Pat. No. 5,365,986 to Hooser, which is also commonly owned and incorporated herein by reference. The cutting device disclosed in that patent has a rigid hub with plural arms distributed about the hub and cutting tools mounted to each of the arms.

Being safe, durable, and relatively fast working, the device discussed above compares well to the available alternatives. Despite its success, a major concern with all such parts for service equipment is replacement cost. Until now, the more durable cutting devices for grinding stump removers have been integrated units that, when worn out, must be fully replaced. This constraint has undesirably contributed to the overall cost of operating stump grinders.

Efforts at creating modular cutting devices that could be partially rather than fully replaced has been complicated in that stump grinding relies on fast rotation. Even a slight imbalance in the cutting device tends to generate rotational instability, making the grinding machine difficult or dangerous to use.

Accordingly, there continues to be a need for a durable, yet cost-effective cutting device for grinding machines.

SUMMARY OF THE INVENTION

The present invention provides a rotatable cutting device that is suitable for stump grinding. It comprises a power shaft having a fixed annular flange, a segmented tool carrier removably mounted to the flange and constituted by plural segments which together form a disc. Each of the segments of the tool carrier have a hub portion and a unitary arm that extends radially and outwardly from the hub portion. Cutting tools are mounted to each arm and together provide a cutting tool array about the periphery of the cutting device. The cutting device may include a retainer removably mounted to the tool carrier to improve rotational stability. The arms carrying the cutting tools may be coplanar or laterally offset from one another.

DESCRIPTION OF THE PREFERRED EMBODIMENTS

Figure 1:
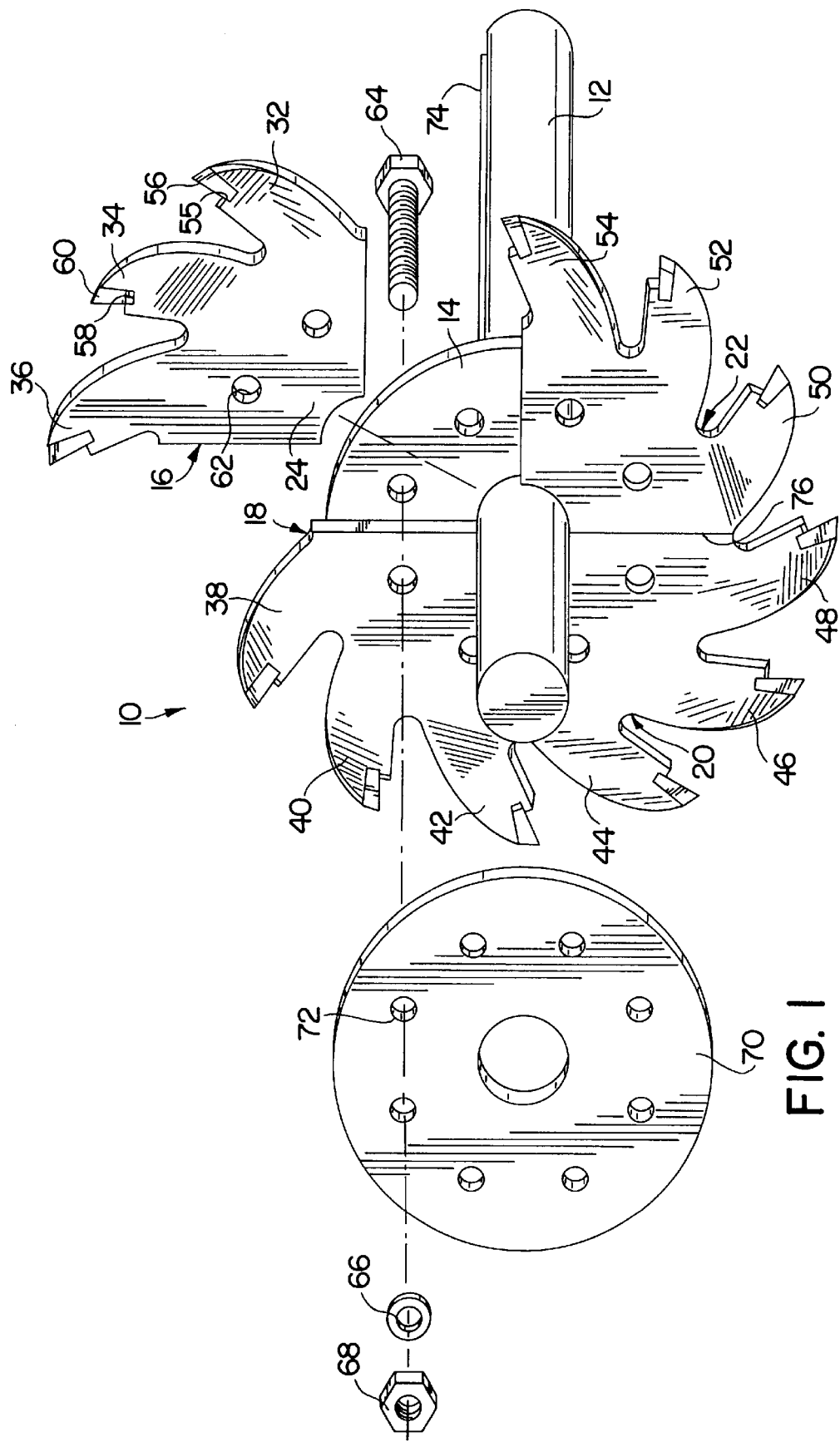
FIG. 1 is a partially exploded perspective view of a rotatable cutting device embodying the present invention.

The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

Figure 2:
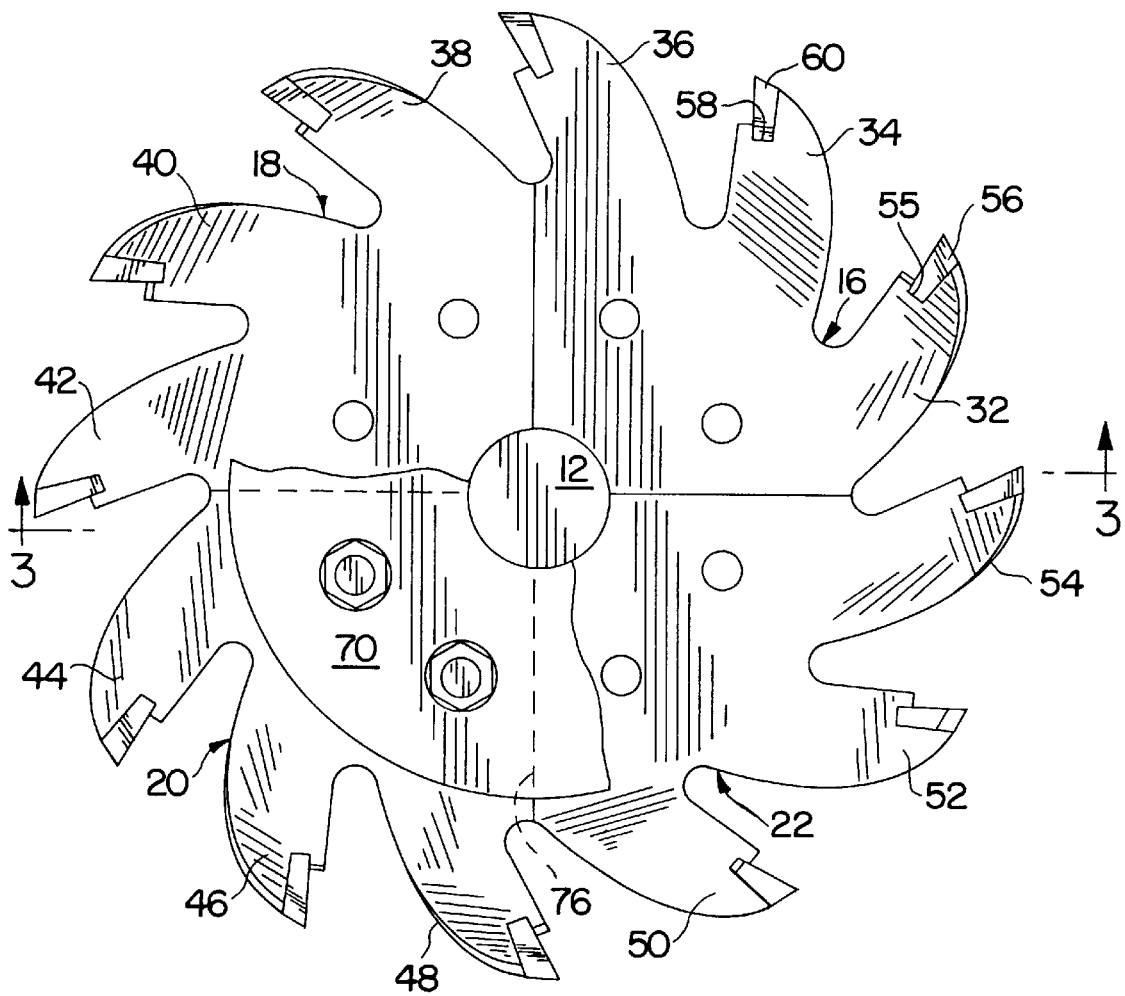
FIG. 2 is a plan view of the cutting device in FIG. 1, shown with a portion of the retainer broken away.
Figure 3:
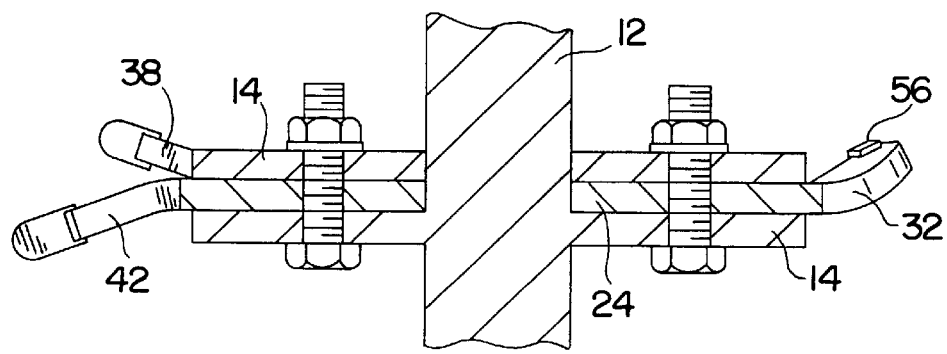
FIG. 3 is a sectional view taken along plane 3—3 in FIG. 2.

Referring now to the FIGS. 1 through 3, a rotatable cutting device 10 has a power shaft 12 with an annular flange 14 and, a planar, segmented tool carrier constituted by four segments 16, 18, 20 and 22. Although four segments are shown, the present invention is not so limited. The cutting tool carrier could include more or less segments as desired.

Positioned on flange 14 and around power shaft 12, segments 16, 18, 20 and 22 together form a disc, or discoid configuration. Segments 16, 18, 20 and 22 each have a hub portion such as hub portion 24 and three unitary arms such as arms 32, 34 and 36. As illustrated, the arms are preferably arcuate and substantially uniformly spaced about the hub portion. Each arm has distal end socket that is adapted to receive a cutting tool. Viewed together, the mounted cutting tools provide a cutting tool array about the periphery of cutting device 10.

Referring to segment 16 for specific explanation, arm 32 defines a socket or slot 55, where a portion of a tungsten carbide cutting tool 56 is received, while arm 34 similarly defines a socket 58 for cutting tool 60. These inlaid cutting tools are fixed in position and preferably mounted to their respective carrier arms by brazing or like expedients. The width of the cutting tools is preferably about the same or slightly wider than the thickness of the supporting arms.

Each carrier segment (16, 18, 20, and 22) is removably mounted to flange 14 preferably by fasteners that extend through both the carrier segment and the flange. Referring again to segment 16 for specific illustration, each segment has two fastener holes such as hole 62 for receiving a bolt such as bolt 64, which is served by a corresponding washer 66 and nut 68. Although the embodiment of the present invention shown in the FIGURES employs multiple bolt-with-nut fasteners that extend through flange 14, the present invention is not so limited. For example, flange 14 could include fixed, threaded shanks extending axially towards the carrier segments.

A cutting tool retainer 70, which is preferably a disc, is removably mounted over the tool carrier. A ring of fastener holes such as hole 72 allows fasteners such as bolt 64 to secure retainer 70 over segments 16, 18, 20 and 22. The arms of segments 16, 18, 20 and 22 extend beyond the periphery of retainer 70. Retainer 70 serves, among other purposes, to enhance rotational stability of cutting device 10.

To achieve a relatively wider kerf, and thus a more rapid stump grinding rate, adjacent arms of cutting device 10 are offset laterally. Specifically, cutting device 10 is provided with four arms 34, 40, 46 and 52 that are substantially coplanar with one another and their corresponding unitary hub portions. On the other hand, arms 32, 36, 38, 42, 44, 48, 50 and 54 are laterally offset from the plane of the hub portions.

Arms 36, 42, 48 and 54 are offset in the direction of flange 14 while arms 32, 38, 44 and 50 are offset to the opposite side of the plane of the hub portions. The extent of the offset for the arms can vary within relatively wide limits depending upon the power available at the power shaft and the desired kerf width. Usually the arm offset from the plane of the hub portions is in the range of about 0.25 inch (6.35 mm) to about 1 inch (25.4 mm). Different offsets for the offset arms on one side of the plane of the hub portions can be employed.

To achieve a relatively faster penetration with a narrow kerf, cutting devices according to the present invention may employ a cutting tool carrier with generally flat configuration in which all arms (on each carrier segment) are substantially coplanar with one another and their corresponding hub portions.

Power shaft 12 is configured for connection to a prime mover. For example, the embodiment shown in the FIGURES has a keyway 74 for connection to a power source. The rotatable cutting device contemplated by the present invention can be driven by a power source (i.e. prime mover) of the general type shown in U.S. Pat. No. 5,034,407 to Hooser and U.S. Pat. No. 5,115,845 to Hooser.

For the embodiment shown in FIGS. 1 through 3, the sides of adjacent carrier segments define an interface that is rectilinear (i.e. straight). Referring to segments 20 and 22 for example, the common sides of these adjacent segments form an interface 76 that is rectilinear.

Figure 4:
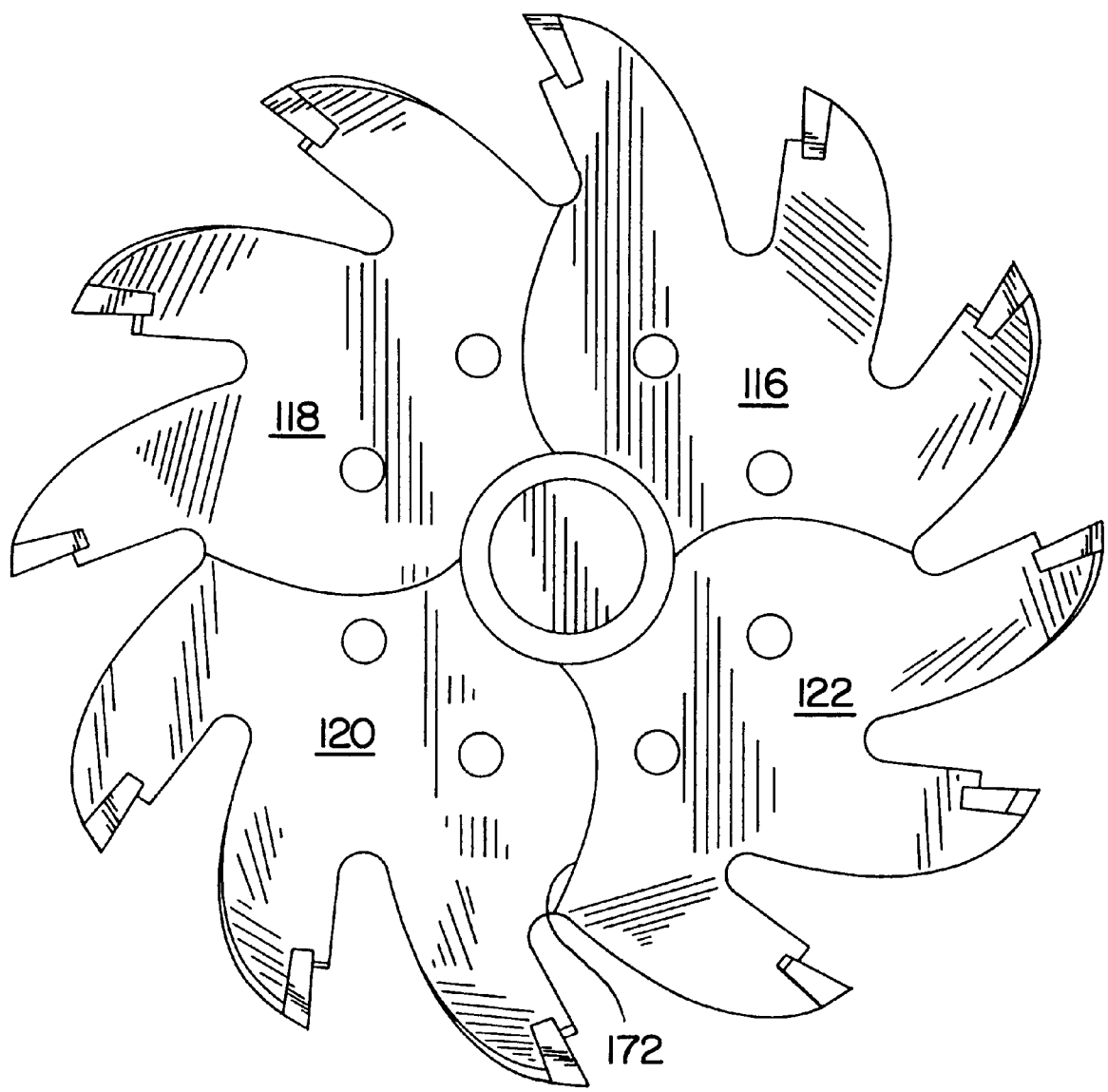
FIG. 4 is a plan view of the carrier segments of a rotatable cutting device according to an alternate embodiment of the present invention.

A configuration in which segments define a nonlinear interface may also be desirable. Referring now to FIG. 4, a tool carrier is constituted by four segments 116, 118, 120 and 122. As shown, the sides of each segment are not linear but curved, and therefore the interface formed between adjacent segments such as interface 172 is curved. This configuration prevents a user of the cutting device from installing individual segments backwards because the common sides of adjacent segments must conform to one another in order to fit together.

In addition, the distal end of carrier segments 16, 18, 20 and 22 may abut power shaft 12, as shown in FIGS. 1 and 2. This configuration is also not critical, however. As shown in FIG. 4, a gap between power shaft 12 and each segment may be present.

The mounted cutting tools are made of a hard, wear-resistant material, usually a refractory material such as cemented carbides. Tool hardness is preferably in the range of about 85 to about 90 Rockwell A hardness units (HRA), more preferably about 88.7 HRA. Such hardness can be readily achieved utilizing straight tungsten carbide-cobalt garde materials that are constituted by tungsten carbide particles bonded with cobalt and having carbide grain sizes in the range of about 0.5 micrometers (m) to about 5 $\mu$m. One such suitable cutting tool material is commercially available from Border City Tool & Mfg. Co., Warren, Mich. 48089, U.S.A.

The other components for the present invention are preferably made of carbon steel such as AISI-SAE 1040 (UNS G 10400). Of course, other sufficiently rigid materials are acceptable. For example, stainless steel may be substituted for enhanced corrosion resistance.

In addition to stump removal, embodiments of the present invention are well suited for ground trenching. In particular, embodiments of the present invention are well suited for trenching applications such as cable laying in which a relatively narrow groove is desirable. Accordingly, an embodiment of the present invention provides a trencher that comprises a power shaft adapted for connection to a prime mover and having an annular flange. A circular tool carrier is removably mounted to said flange and constituted by plural segments which together form a disc. Each of the segments has a hub portion and at least one arcuate arm extending out radially from the hub portion. Mounted to the distal end of each arm is a cutting tool. Together, the cutting tools form a cutting tool array about the periphery of the cutting device.

The foregoing specification and drawings are to be taken as illustrative but not limiting of the present invention. Still other cutting device configurations and embodiments utilizing the spirit and scope of the present invention are possible, and will readily present themselves to those skilled in the art.

We claim:

1. A rotatable cutting device suitable for stump grinding that comprises:
   a power shaft having an annular flange;
   a planar, segmented tool carrier removably mounted to said flange and constituted by plural abutting segments which together form a disc, each of said segments having a hub portion and a unitary arm extending radially outwardly from said hub portion; and
   a cutting tool mounted to each said arm, the cutting tools together providing a cutting tool array about the periphery of the cutting device.

2. The cutting device of claim 1 further including a fastener extending through said tool carrier for removably securing said segments to said flange.

3. The cutting device of claim 1 further comprising a retainer removably mounted to said tool carrier with a portion of said arms extending beyond the periphery of said cover.

4. The cutting device of claim 1 wherein said tool carrier is constituted by four segments.

5. The cutting device of claim 1 wherein adjacent segments have conforming adjacent sides.

6. The cutting device of claim 5 wherein said adjacent sides define an interface between adjacent segments and said interface is rectilinear.

7. The cutting device of claim 5 wherein said adjacent sides define an interface between adjacent segments and said interface is curved.

8. The cutting device of claim 1 wherein the hub of each said segment abuts said power shaft.

9. The cutting device of claim 1 wherein said arm is arcuate.

10. The cutting device of claim 1 wherein a socket is defined by said arm and wherein a portion of said cutting tool is received within said socket.

11. The cutting device of claim 1 wherein said segments have plural arms substantially uniformly spaced about the hub portion and extending radially outwardly from the hub portion with a cutting tool mounted to each of said plural arms so as to provide an array of arms each with a cutting tool about the periphery of the cutting device.

12. The cutting device of claim 12 wherein at least some of said arms are substantially coplanar.

13. The cutting device of claim 12 wherein adjacent arms are laterally offset relative to one another.

14. The cutting device of claim 1 wherein said power shaft defines a keyway.

15. A trencher comprising:
    a power shaft adapted for connection to a prime mover and having an annular flange;
    a circular tool carrier removably mounted to said flange and constituted by plural segments which together form a disc, each of said segments having a hub portion and at least one arcuate arm extending radially outwardly from said hub portion; and
    a cutting tool mounted to each said arm of each said segment, said mounted cutting tools together providing a cutting tool array about the periphery of the cutting device.

16. The trencher of claim 15 further comprising a tool carrier retainer removably mounted to said circular tool carrier with a portion of said arms extending beyond the periphery of said retainer.

17. The trencher of claim 15 wherein said tool carrier is constituted by four segments.

* * * * *